United States Patent [19]

Shibayama

[11] Patent Number: 4,827,399
[45] Date of Patent: May 2, 1989

[54] COMMON FILE SYSTEM FOR A PLURALITY OF DATA PROCESSORS

[75] Inventor: Shigeru Shibayama, Tokyo, Japan
[73] Assignee: NEC Corporation, Tokyo, Japan
[21] Appl. No.: 102,618
[22] Filed: Sep. 30, 1987
[30] Foreign Application Priority Data

Oct. 3, 1986 [JP] Japan ................... 61-236820

[51] Int. Cl.[4] ........................................... G06F 15/16
[52] U.S. Cl. ................................................... 364/200
[58] Field of Search ... 364/200 MS File, 900 MS File, 364/300

[56] References Cited

U.S. PATENT DOCUMENTS

| | | | |
|---|---|---|---|
| 4,030,075 | 6/1977 | Barlow | 364/200 |
| 4,130,865 | 12/1978 | Heart et al. | 364/200 |
| 4,180,854 | 12/1979 | Walden et al. | 364/200 |
| 4,414,624 | 11/1983 | Summer et al. | 364/200 |
| 4,442,502 | 4/1984 | Friend et al. | 364/900 |
| 4,543,626 | 9/1985 | Bean et al. | 364/200 |
| 4,570,217 | 2/1986 | Allen et al. | 364/900 |

*Primary Examiner*—David Y. Eng
*Attorney, Agent, or Firm*—Foley & Lardner, Schwartz, Jeffery, Schwaab, Mack, Blumenthal & Evans

[57] ABSTRACT

A common file system for a plurality of data processors according to the present invention includes a plurality of data processors, update history files capable of distributing and outputting history files to the data processors, a close and recovery controller for activating close processing of a block which is update-locked by a transaction task being processed in an abnormally-stopped data processor and recovery processing in units of update history files, and a close executer, activated by the close and recovery controller, for closing the block which is update-locked, thereby sending back an access request for the closed block to other operating data processors. The system further includes an individual file recovery executer for recovering contents of the closed block to a state before updating in accordance with the assigned update history file, and an individual close release executer for releasing closing of the block recovered by the individual file recovery executer, thereby enabling access from other operating data processors to the block which is released from closing.

4 Claims, 2 Drawing Sheets

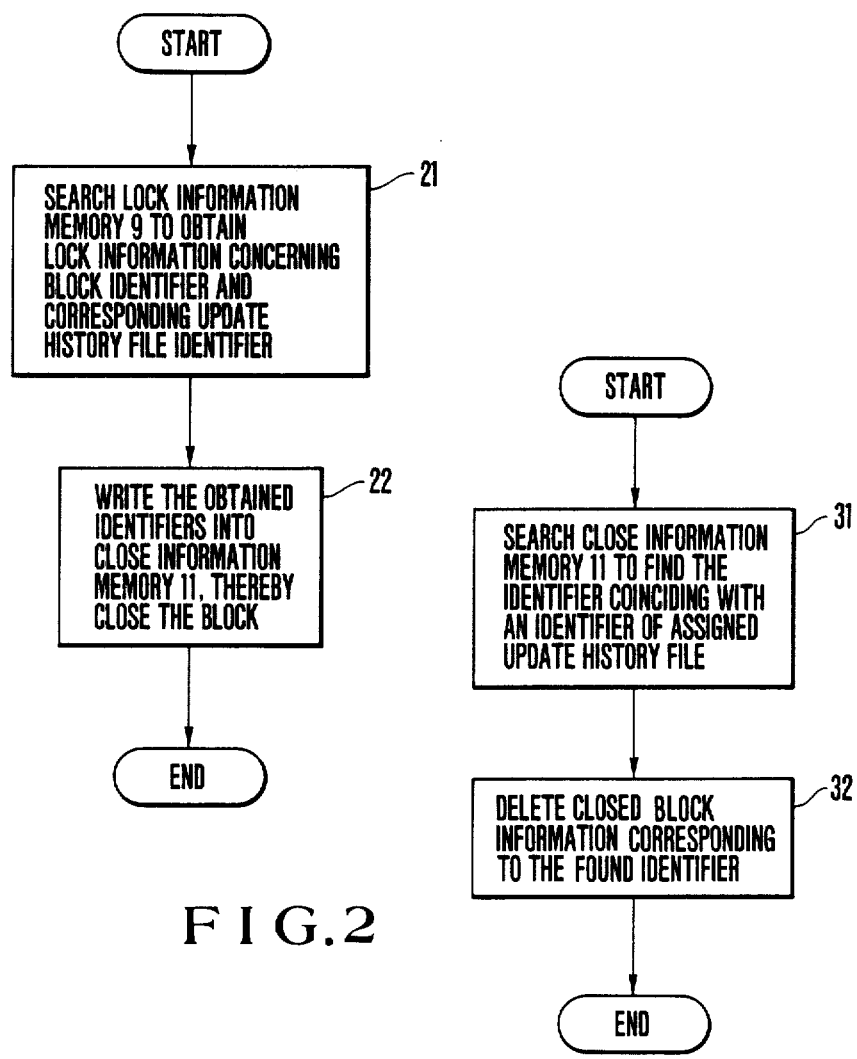

COMMON FILE SYSTEM FOR A PLURALITY OF DATA PROCESSORS

BACKGROUND OF THE INVENTION

The present invention relates to a common file system for a plurality of data processors and, more particularly, to a system for controlling use of a file when data in the file is commonly used in units of blocks or exclusive use of files for a plurality of data processors.

In a system wherein a plurality of data processors use files in common in units of blocks, when one of the plurality of data processors updates one block, the block is update-locked by a transaction task, and no access request with respect to the block from other data processors is accepted.

In a conventional system wherein an update history file is provided for each task processing program group, if a data processor updating a file is abnormally stopped, a block which is locked is recovered to a state before updating by a file updating unit in accordance with all the update history files corresponding to a transaction task being processed in the abnormally stopped data processor, and then closing with respect to the block being released. That is, closing of the block which is update-locked by the transaction task being processed in the abnormally stopped data processor is not released immediately after completion of file recovery by one update history file but is released after completion of file recovery processing by all the update history files. Therefore, if an access request with respect to the recovered block from other data processors exists before the file recovery processing by all the update history files is completed, access processing cannot be executed until the file recovery processing by all the update history files is completed.

SUMMARY OF THE INVENTION

It is, therefore, an object of the present invention to provide a common file system for a plurality of data processors, which eliminates the above drawbacks of the conventional technique.

In order to achieve the above object, there is provided a common file system for a plurality of data processors, comprising a plurality of data processors each having a task program for executing transaction processing, an external memory including files which are commonly or exclusively used by the plurality of data processors in units of blocks and update history files arranged in units of groups of the task processing programs and adapted to distribute and output update histories of the update history files to the data processors, a lock control unit for controlling lock of a block which is updated by transaction processing an of the plurality of data processors, informing unit for detecting that one of the plurality of data processors is abnormally stopped and for informing an abnormal stop to other data processors of the plurality of data processors, a close and recovery control unit for activating close processing of a block which is update-locked by a transaction task being processed in the abnormally stopped data processor and recovery processing in units of the update history files in accordance with information from the informing unit, a close unit, activated by the close and recovery control unit, for closing the block which is update-locked, thereby sending back an access request for the closed block as an error to other operating data processors, an individual file recovery unit, activated in units of the update history files by the close and recovery control unit, for recoverying contents of the closed block to a state before updating in accordance with the assigned update history file, and an individual close release unit, activated in units of the update history files by the individual file recovery unit, for releasing closing of the block recovered by the individual file recovery unit, thereby enabling access from other operating data processors to the block which is released from closing.

BRIEF DESCRIPTION OF THE DRAWINGS

FIGS. 2 and 3 are respectively flow charts for explaining part of an operation of the system shown in FIG. 1.

DESCRIPTION OF THE PREFERRED EMBODIMENT

Figure 1:
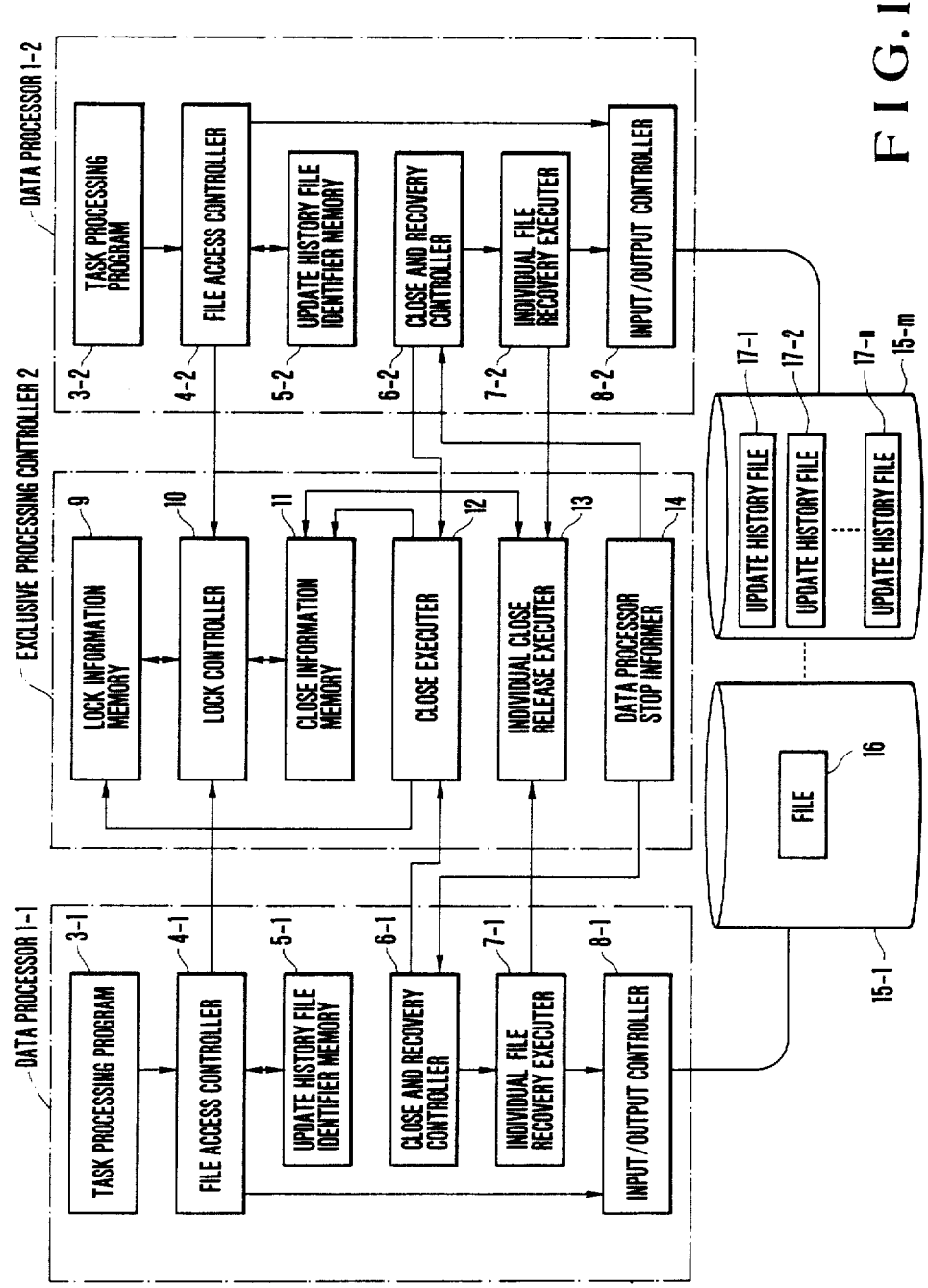
FIG. 1 is a block diagram showing an arrangement of the present invention.

An embodiment of the present invention will be described below with reference to the accompanying drawings.

FIG. 1 is a block diagram showing an embodiment of the common file system for a plurality of data processors according to the present invention.

In FIG. 1, a data processor 1-1 comprises a task processing program 3-1, a file access controller 4-1, an update history file identifier memory 5-1, a close and recovery controller 6-1, an individual file recovery executer 7-1, and an input/output controller 8-1.

A data processor 1-2 comprises a task processing program 3-2, a file access controller 4-2, an update history file identifier memory 5-2, a close and recovery controller 6-2, an individual file recovery executer 7-2, and an input/output controller 8-2.

An exclusive processing controller 2 comprises a lock information memory 9, a lock controller 10, a close information memory 11, a close executer 12, an individual close and release executer 13, and a data processor stop informer 14. External memories 15-1 to 15-m store a file 16 and update history files 17-1 to 17-n.

The data processors 1-1 and 1-2 commonly use the file 16 in the external memories 15-1 to 15-m.

The data processor 1-1 will be described below. The data processor 1-2 is the same as the data processor 1-1. The task program 3-1 requests access with respect to the file 16. In accordance with the access request from the task program 3-1, the file access controller 4-1 provides outputs to the update history file identifier memory 5-1 which stores respective identifiers of the updata history files 17-1 to 17-n, the lock controller 10 of the exclusive processing controller 2, and the input/output controller 8-1.

The close and recovery controller 6-1 activates close processing of a block which is update-locked by a transaction task being processed in the data processor 1-1 and recovery processing of each of the update history files 17-1 to 17-n when the data processor 1-1 is abnormally stopped.

The individual file recovery executer 7-1 is activated in units of the update history files 17-1 to 17-n by the close and recovery controller 6-1 and recovers contents of a block closed by the close executer 12 to a state before updating on the basis of an assigned one of the update history files 17-1 to 17-n.

The input/output controller 8-1 controls input/output of data between the data processor 1-1 and the external memories 15-1 to 15-m in accordance with outputs from the file access controller 4-1 and the individual file recovery executer 7-1.

An arrangement of the exclusive processing controller 2 will be described below.

The lock information memory 9 stores lock information consisting of a pair of an identifier of a block to be locked and an update history file identifier.

The lock controller 10 receives an output from the file access controller 4-1 or 4-2 and stores the lock information in the lock information memory 9.

The close information memory 11 stores a close state of a block.

The close executer 12 is activated by the close and recovery controllers 6-1 and 6-2 and closes a block which is update-locked by a transaction task being processed in the abnormally stopped data processor 1-1 or 1-2, sending back an access request for the closed block as an error to the other operating data processor 1-2 or 1-1.

The individual close release executer 13 is activated by the individual file recovery executers 7-1 and 7-2 in units of the update history files 17-1 to 17-n and releases closing of the block which is recovered by the individual file recovery executers 7-1 and 7-2, thereby enabling access from the other operating data processor 1-2 or 1-1 to the block which is released from closing.

An operation of the common file system for a plurality of data processors having the arrangement shown in FIG. 1 will be described below.

For example, when an access request to the file 16 is outputted from the task processing program 3-1, the file access controller 4-1 accesses the update history file identifier memory 5-1 to obtain an identifier of an update history file, e.g., the update history file 17-1 corresponding to the task processing program 3-1.

Then, the file access controller 4-1 provides the lock controller 10 with an identifier of a block which includes the data access requested and the identifier of the update history file 17-1.

The lock controller 10 refers to the lock information memory 9. If the block can be locked, the lock controller 10 writes the pair of identifiers of the block and the update history file 17-1 into the lock information memory 9.

If the data processor 1-1 is abnormally stopped, the data processor stop informer 14 informs the close and recovery controller 6-2 in the other operating data processor 1-2 that the data processor 1-1 is abnormally stopped.

The informed close and recovery controller 6-2 informs the close executer 12 that the data processor 1-1 is abnormally stopped.

FIG. 2 is a flow chart for explaining an operation of the close executer 12.

In step 21 of FIG. 2, the close executer 12 searches lock information memory 9 to obtain lock information concerning the identifier of the block which is update-locked by the transaction task being processed in the data processor 1-1 and the identifier of the corresponding update history file 17-1. In step 22, the close executer 12 writes the obtained identifiers into the close information memory 11 as closed block information, thereby closing the block.

After the block is closed by the close executer 12, the close and recovery controller 6-2 activates the individual file recovery executer 7-2 with respect to the update history file 17-1.

The individual file recovery executer 7-2 reads the block through the input/output controller 8-2 on the basis of data before updating in the assigned update history file 17-1, recovers the block to a state before updating, and then rewrites it in the file 16 by the input/output controller 8-2.

After the block is thus recovered, the individual file recovery executer 7-2 activates the individual close release executer 13 while providing the identifier of the update history file 17-1.

FIG. 3 is a flow chart for explaining an operation of the individual close release executer 13.

In step 31 of FIG. 3, the individual close release executer 13 searches close information memory 11 to find the identifier coinciding with an identifier of the assigned update history file 17-1. Then, in step 32, the individual close release executer 13 deletes the closed block information corresponding to the found identifier from the close information memory 11, thereby releasing closing of the block which is completely recovered.

When processing with respect to the update history file 17-1 is finished, the close and recovery controller 6-2 sequentially repeats the above processing with respect to the update history files 17-2 to 17-n.

Note that in the above embodiment, the description has been made with reference to the case wherein the data processor 1-1 is abnormally stopped. However, it is a matter of course that the operation is the same when the data processor 1-2 is abnormally stopped.

As has been described above, an update history file is provided for each task processing program group, and the file is used in common between a plurality of data processors. When one of the data processors is abnormally stopped during updating of the file, a block which is update-locked by a transaction task being processed in the abnormally stopped data processor is closed in correspondence to the respective update history files. Then, after file recovery processing by the respective update history files is completed, closing with respect to the recovered block is sequentially released, thereby rapidly enabling access requests from other data processors to the recovered block.

What is claimed is:

1. A common file system for a plurality of data processors, comprising:

a plurality of data processors each having a task processing program for executing transaction processing;

an external memory including files which are commonly or exclusively used by said plurality of data processors in units of blocks and update history files arranged in units of groups of the task processing programs and adapted to distribute and output update histories of the update history files to said data processors;

lock control means for controlling lock of a block which is updated by transaction processing of said plurality of data processors;

informing means for detecting that one of said plurality of data processors is abnormally stopped and informing an abnormal interruption to other operating data processors of said plurality of data processors;

close and recovery control means for activating close processing of a block which is update-locked by a task processing program being processed in said abnormally stopped data processor and recovery processing in units of the update history files in accordance with information from said informing means;

close means, activated by said close and recovery control means, for closing the block which is update-locked, thereby sending back an access request for the closed block as an error to said other operating data processor;

individual file recovery means, activated in units of the update history files by said close and recovery control means, for recoverying contents of the closed block to a state before updating in accordance with the update history file; and individual close release means, activated in units of the update history files by said individual file recovery means, for releasing closing of the block recovered by said individual file recovery means, thereby enabling an access from said other operating data processors to the block which is released from closing.

2. A system according to claim 1, wherein each of said plurality of data processors comprises said close and recovery control means and said individual file recovery means.

3. A system according to claim 2, wherein said close means comprises a memory for storing information concerning the closed block and writing means, connected to said close and recovery means of each of said data processors, for writing close information into said memory in accordance with the information that the data processor is abnormally stopped from said close and recovery control means.

4. A system according to claim 3, wherein said individual close release means comprises searching means, connected to said close and recovery control means of each of said data processors, and informed of recovery of the block in units of the update history files from said close and recovery control means, for searching said memory in said close means.

* * * * *